United States Patent
Takahashi

(10) Patent No.: US 9,004,122 B2
(45) Date of Patent: Apr. 14, 2015

(54) PNEUMATIC TIRE

(75) Inventor: Toshihiko Takahashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1029 days.

(21) Appl. No.: 13/090,306

(22) Filed: Apr. 20, 2011

(65) Prior Publication Data

US 2011/0277895 A1 Nov. 17, 2011

(30) Foreign Application Priority Data

May 13, 2010 (JP) .................................. 2010-111237

(51) Int. Cl.
*B60C 11/01* (2006.01)
*B60C 13/02* (2006.01)
*B60C 11/03* (2006.01)
*B60C 11/13* (2006.01)

(52) U.S. Cl.
CPC ............. *B60C 11/01* (2013.01); *B60C 2200/14* (2013.04); *B60C 11/0306* (2013.04); *B60C 11/1392* (2013.04); *B60C 2011/0367* (2013.04); *B60C 2011/0346* (2013.04)

(58) Field of Classification Search
None
See application file for complete search history.

(56) References Cited

U.S. PATENT DOCUMENTS

| 5,803,999 A | * | 9/1998 | Shibata | 152/209.14 |
| 6,138,728 A | * | 10/2000 | Miyazaki | 152/209.15 |
| D478,865 S | * | 8/2003 | Dixon et al. | D12/603 |
| 2011/0162770 A1 | * | 7/2011 | Yamakawa | 152/209.18 |

FOREIGN PATENT DOCUMENTS

| JP | 06-24211 A | | 2/1994 |
| JP | 2006137230 A | | 6/2006 |
| WO | WO 2010/030001 | * | 3/2010 |

OTHER PUBLICATIONS

Office Action for Japanese Patent Application No. 2010-111237 dated Sep. 27, 2013.

* cited by examiner

*Primary Examiner* — Justin Fischer
(74) *Attorney, Agent, or Firm* — Fish & Richardson P.C.

(57) ABSTRACT

A pneumatic tire has a shoulder land portion including a tread edge and a plurality of lateral grooves which are open to an outer wall of the shoulder land portion in a tread surface. One end in a tire circumferential direction of the outer wall is positioned on an inner side in a tire width direction with respect to another end between the lateral grooves which are adjacent to each other. A vacancy communicating with the lateral groove from the one end of the outer wall is formed so as to face the outer wall. A pawl portion protruding in the tire circumferential direction is provided in a wall surface of the lateral groove which is close to the other end of the outer wall. A height of the pawl portion from a bottom of the lateral groove is gradually decreased toward a leading end.

4 Claims, 4 Drawing Sheets

PNEUMATIC TIRE

BACKGROUND OF THE INVENTION

1. Field of the Invention

The present invention relates to a pneumatic tire which can improve an off-road performance and a snow performance.

2. Description of the Related Art

In a tire which is used for traveling on an off-road or snow, it is important to enhance traction (a traction force) on a muddy place or a snowy road. In this kind of tire, generally, there is employed a block pattern in which a large number of blocks are provided in a tread surface, and an improvement of the traction is achieved by a mud sweeping action or a snow sweeping action of lateral grooves comparting the blocks, however, it goes without saying that a further improvement of the performance is desirable.

In Japanese Unexamined Patent Publication No. 6-24211 (paragraph 0019, FIGS. 10 and 11), there is described a pneumatic tire in which an outer wall of a shoulder land portion is comparted at a fixed distance, and crests of concavity and convexity rows formed in the respective comparted sections are inclined in a diametrical direction, and there is disclosed a structure in which a tread edge is inclined with respect to a tire circumferential direction as one embodiment thereof. However, the tire merely aims at the suppression of a generation of an irregular wear and a wandering phenomenon, and there is not disclosed a structure for improving an off-road performance and a snow performance.

SUMMARY OF THE INVENTION

The present invention is made by taking the actual conditions mentioned above into consideration, and an object of the present invention is to provide a pneumatic tire which can improve an off-road performance and a snow performance.

The object can be achieved by the following present invention. That is, the present invention provides a pneumatic tire comprising a shoulder land portion including a tread edge, a plurality of lateral grooves which are open to an outer wall of the shoulder land portion and are arranged so as to be spaced from each other in a tire circumferential direction, the shoulder land portion and the lateral grooves being formed in a tread surface, wherein one end in the tire circumferential direction of the outer wall is positioned on an inner side in a tire width direction with respect to another end between the lateral grooves which are adjacent to each other in the tire circumferential direction, and a vacancy communicating with the lateral groove from the one end of the outer wall is formed so as to face the outer wall, and a pawl portion protruding in the tire circumferential direction is provided in a wall surface of the lateral groove which is close to the other end of the outer wall, and a height of the pawl portion from a bottom of the lateral groove is gradually decreased toward a leading end.

In accordance with the pneumatic tire of the present invention, at a time of traveling on an off-road, mud in a muddy place enters the vacancy of the shoulder land portion, and such mud can be scooped by a cooperation of the pawl portion and the lateral groove. Further, since the height of the pawl portion is gradually decreased toward the leading end thereof, mud entering the vacancy is smoothly discharged, and a good mud scooping action can be achieved by the shoulder land portion. Even in the traveling on a snowy road, it can function in the same manner, and a good snow scooping action can be achieved by the shoulder land portion. As a result, it is possible to enhance the traction on the muddy place and the snowy road, and to improve the off-road performance and the snow performance.

In the present invention, it is preferable that the height in the leading end of the pawl portion is from 0 to 50% of the depth of the lateral groove. Accordingly, it is possible to more smoothly discharge mud or snow entering the vacancy, and it is possible to enhance an effectiveness of the mud scooping action or the snow scooping action by the shoulder land portion.

In the present invention, it is preferable that the pawl portion is formed in a tapered shape in a plan view. Accordingly, it is possible to easily secure the volume of the vacancy, and it is also possible to easily scoop mud or snow by the cooperation of the pawl portion and the lateral groove, whereby it is possible to enhance the effectiveness of the mud scooping action or the snow scooping action by the shoulder land portion.

In the present invention, it is preferable that an outer surface in the tire width direction of the pawl portion extends in an extending direction of the tread edge, and the outer wall is formed to be flat. In accordance with the structure mentioned above, it is possible to easily secure the volume of the vacancy, and it is also possible to encourage mud or snow entering the vacancy and being discharged from the vacancy, whereby it is possible to enhance the effectiveness of the mud scooping action or the snow scooping action by the shoulder land portion.

DETAILED DESCRIPTION OF THE PREFERRED EMBODIMENTS

Figure 1:
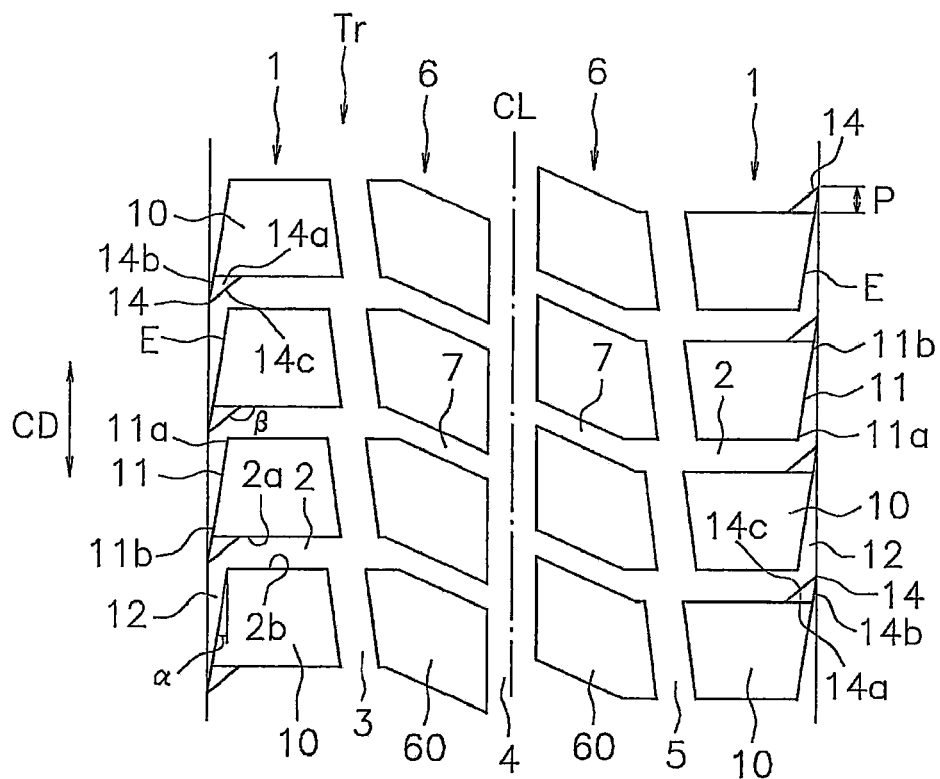
FIG. 1 is a plan view showing an example of a tread surface of the pneumatic tire of the present invention.

An embodiment of the present invention will be explained with reference to the drawings. As shown in FIG. 1, in a tread surface Tr of a pneumatic tire in accordance with the present embodiment, there are formed a shoulder land portion 1 including tread edges E, and a plurality of lateral grooves 2 which are open to an outer wall 11 of the shoulder land portion 1 and are arranged so as to be spaced in a tire circumferential direction CD. In more detail, circumferential grooves 3 to 5 extending in the tire circumferential direction CD are formed in the tread surface Tr, and a pair of shoulder land portions 1 arranged on an outer side of the circumferential grooves 3 and 5 positioned on an outermost side thereof are constituted by block rows.

This tire employs a block pattern in which a large number of blocks are provided in the tread surface Tr, and a pair of center land portions 6 arranged between the circumferential grooves 3 and 5 are also constituted by block rows. In other words, the shoulder land portions 1 and the center land portions 6 are comparted into a plurality of shoulder blocks 10 and center blocks 60 by lateral grooves 2 and 7. The lateral grooves 2 extend to outer sides in a tire width direction from the circumferential grooves 3 and 5 so as to be open to the outer walls 11, and run across the shoulder land portions 1.

Figure 2:
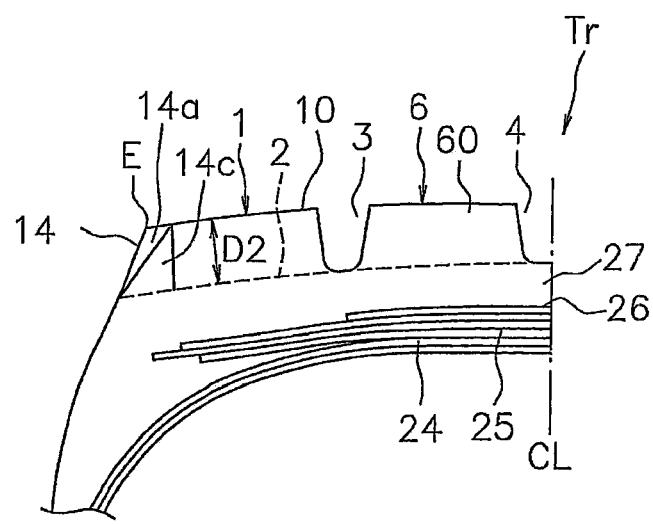
FIG. 2 is a sectional view of a tire meridian showing the pneumatic tire.

As shown in FIG. 2, this tire employs a square shape in which each of the tread edges E is angulated as a shoulder shape, not a round shape in which the tread edge is gently curved. The tread edge E corresponds to a ridge line between a top surface of the shoulder land portion 1 and the outer wall 11, and is located at an outermost position in the tire width direction of the tread surface Tr grounding on a flat road surface. The tread edge E discontinuously extends along the tire circumferential direction CD, and is inclined with respect to the tire circumferential direction CD per block 10 as shown in FIG. 1.

A carcass layer 24 is constituted by at least one carcass ply including a cord extending approximately perpendicularly to a tire equator CL, and is arranged between a pair of bead portions (not shown) to constitute a frame of the tire. The carcass layer 24 is provided on an outer periphery thereof with a belt layer 25 for reinforcing the carcass layer 24. The belt layer 25 is provided on an outer periphery thereof with a belt reinforcing layer 26 and a tread rubber 27, and the tread surface Tr constitutes an outer peripheral surface of the tread rubber 27.

Figure 3:
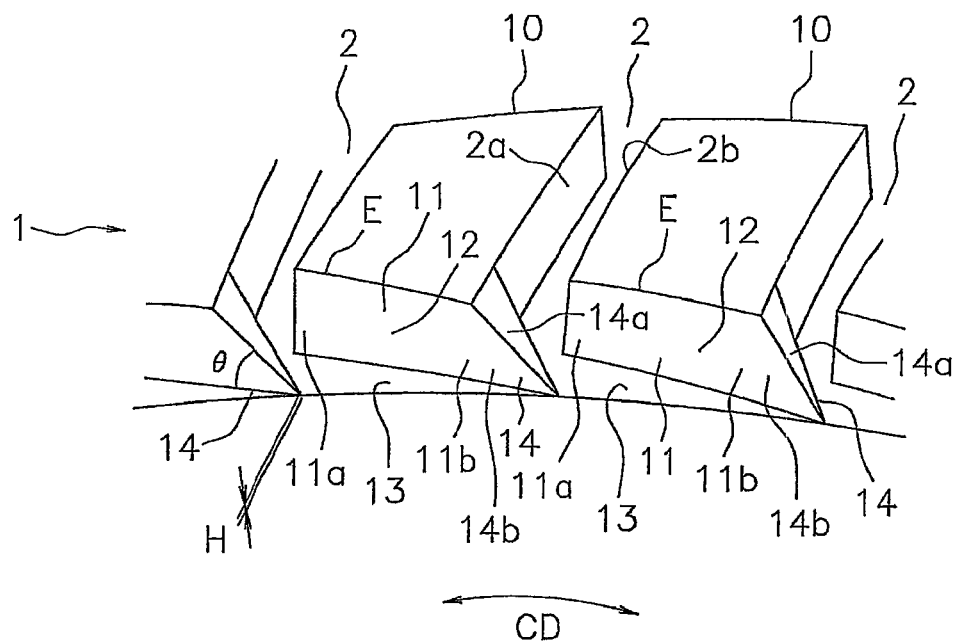
FIG. 3 is a perspective view of a shoulder land portion as seen from an outer side in a tire width direction.

As shown in FIGS. 1 and 3, one end 11*a* in the tire circumferential direction CD of the outer wall 11 is positioned on an inner side in the tire width direction with respect to the other end 11*b* between the lateral grooves 2 which are adjacent to each other in the tire circumferential direction CD, and a vacancy 12 communicating with the lateral groove 2 from the one end 11*a* of the outer wall 11 is formed to face to the outer wall 11. Since the outer wall 11 is inclined with respect to the tire circumferential direction CD in this manner, a non-grounded surface 13 having a height as that of a bottom of the lateral groove 2 is formed in front of the outer wall 11, and a space positioned in an outer periphery of the non-grounded surface 13 configures the vacancy 12. The vacancy 12 extends in the tire circumferential direction CD between the other ends 11*b* of the outer walls 11 which are adjacent to each other in the tire circumferential direction CD.

A pawl portion 14 protruding in the tire circumferential direction CD is provided in a wall surface 2*a* of the lateral groove 2 which is close to the other end 11*b* of the outer wall 11 in a pair of wall surfaces 2*a* and 2*b* provided in the lateral groove 2. The pawl portion 14 is formed in the vicinity of an opening of the lateral groove 2 in the outer wall 11, and extends toward the vacancy 12 facing the adjacent outer wall 11. The pawl portion 14 is chamfered, and is structured such that a height of the pawl portion 14 from the bottom of the lateral groove 2 is gradually decreased toward a leading end thereof.

Figure 4:
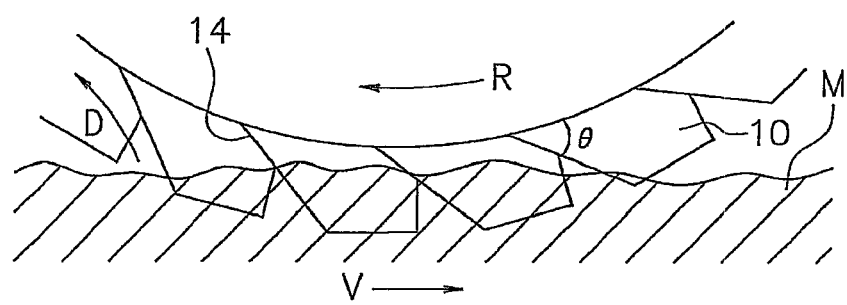
FIG. 4 is a schematic view showing a state at a time of traveling on an off-road.

As schematically shown in FIG. 4, when traveling on an off-road with this tire, mud in a muddy place M enters the vacancy 12, and mud can be scooped by a cooperation of the pawl portion 14 and the lateral groove 2. Further, since the height of the pawl portion 14 is gradually decreased toward the leading end thereof, mud entering the vacancy 12 is smoothly discharged (refer to an arrow D), and a good mud scooping action can be achieved by the shoulder land portion 1. Even in the traveling on a snowy road, it can function in the same manner, and a good snow scooping action can be achieved by the shoulder land portion 1. As a result, it is possible to enhance the traction on the muddy place and the snowy road, and to improve the off-road performance and the snow performance. An arrow R indicates a rotating direction of the tire, and an arrow V indicates a forward moving direction of a vehicle.

On the contrary, in a case where the tread edge E extends in parallel to the tire circumferential direction CD, the vacancy 12 is not formed, and the pawl portion 14 is not provided in the block 10, a mud scooping action or a snow scooping action as mentioned above is not caused in the periphery of the tread edge E. Therefore, effects of improving the off-road performance and the snow performance cannot be obtained. Further, in a case where the pawl portion 14 is not provided even if the vacancy 12 is formed, mud or snow tends to clog in the vacancy 12 and the lateral groove 2. Accordingly, there is a risk that the traction cannot be appropriately achieved.

In the light of more smoothly discharging mud or snow entering the vacancy 12 and enhancing an effectiveness of the mud scooping action or the snow scooping action by the shoulder land portion 1, a height H in the leading end of the pawl portion 14 is preferably from 0 to 50% of a groove depth D2 of the lateral groove 2, and is more preferably from 0 to 20%. In the present embodiment, a chamfered surface 14*a* of the pawl portion 14 reaches the non-grounded surface 13, and the height H is substantially 0% of the groove depth D2.

It is preferable that the pawl portion 14 is formed in a tapered shape in a plan view. Accordingly, it is possible to easily secure the volume of the vacancy 12, and it is also possible to easily scoop mud or snow by the cooperation of the pawl portion 14 and the lateral groove 2, whereby it is possible to enhance the effectiveness of the mud scooping action or the snow scooping action by the shoulder land portion 1. In the present embodiment, as shown in FIG. 1, the pawl portion 14 is formed in a triangular shape in a plan view, so as to have a more preferable constitution for enhancing the improvement effect mentioned above.

In a general tire in which the shoulder shape is formed in a square shape, since the tread edge extends in parallel to the tire circumferential direction, there is a tendency of causing a so-called wandering phenomenon that the vehicle tends to swing on a rutted road surface. On the contrary, in the pneumatic tire in accordance with the present invention, since the tread edge E is inclined with respect to the tire circumferential direction CD, and the pawl portion 14 functions to reinforce the block 10, thereby being effective for suppressing the occurrence of the wandering phenomenon.

Further, in the tire, since the square shape is retained within the block 10, it is possible to suppress a rigidity difference in the tire circumferential direction CD in the block 10. In spite of this, since it is unnecessary to differentiate the shape per block 10, and each of the blocks 10 can be uniformly constituted, it is possible to suppress the rigidity difference even between the blocks 10 which are adjacent to each other in the tire circumferential direction CD. Accordingly, it is effective for suppressing a heel and toe wear, and it is possible to prevent a pattern noise generated thereby from being deteriorated.

It is preferable that an angle of incline α (refer to FIG. 1) with respect to the tire circumferential direction CD of the tread edge E is from 2 to 15 degrees. When the angle α is equal to or more than 2 degrees, it is easy to appropriately secure a volume of the vacancy 12 and it is possible to appropriately suppress the occurrence of the wandering phenomenon. Further, when the angle α is equal to or less than 15 degrees, an advantageous constitution for suppressing the heel and toe wear can be obtained.

In the present embodiment, an outer surface 14*b* in the tire width direction of the pawl portion 14 extends in an extending direction of the tread edge E, and the outer wall 11 is formed to be flat. Accordingly, it is possible to easily secure the volume of the vacancy 12, and it is also possible to encourage mud or snow entering the vacancy 12 and being discharged from the vacancy 12, whereby it is possible to enhance the effectiveness of the mud scooping action or the snow scooping action by the shoulder land portion 1.

An inner surface 14c in the tire width direction of the pawl portion 14 extends to an outer side in the tire width direction toward a protruding direction of the pawl portion 14, and a V-shaped and bent wall surface is constituted by this inner surface 14c and the wall surface 2a of the lateral groove 2. At a time of traveling on the off-road or the snowy road, it is possible to receive mud or snow entering the vacancy 12 by the bent wall surface, and it is possible to cause the strong mud scooping action or the snow scooping action. An angle β (refer to FIG. 1) of the bent wall surface is set, for example, to 170 degrees or less, and an angle from 90 to 170 degrees is specifically exemplified.

A protruding amount P of the pawl portion 14 from the wall surface 2a is, for example, from 3 to 15 mm, and is preferably equal to or more than the width of the lateral groove 2 for enhancing the mud scooping action or the snow scooping action mentioned above. Further, in the present embodiment, since the chamfered surface 14a is formed from a root to a leading end of the pawl portion 14, an angle of incline θ of the chamfered surface 14a is gentle, and it is easy to smoothly discharge mud or snow by a centrifugal force generated by the tire rotation. The angle of incline θ is set, for example, from 10 to 50 degrees.

In the pneumatic tire in accordance with the present invention, an installing direction with respect to the vehicle may be designated or may not be designated. In the present embodiment, since the pawl portion 14 of the shoulder land portion 1 facing the circumferential groove 3 and the pawl portion 14 of the shoulder land portion 1 facing the circumferential groove 5 protrude inversely to each other as shown in FIG. 1, the improvement effect mentioned above can be obtained regardless of the installing direction.

Figure 5:
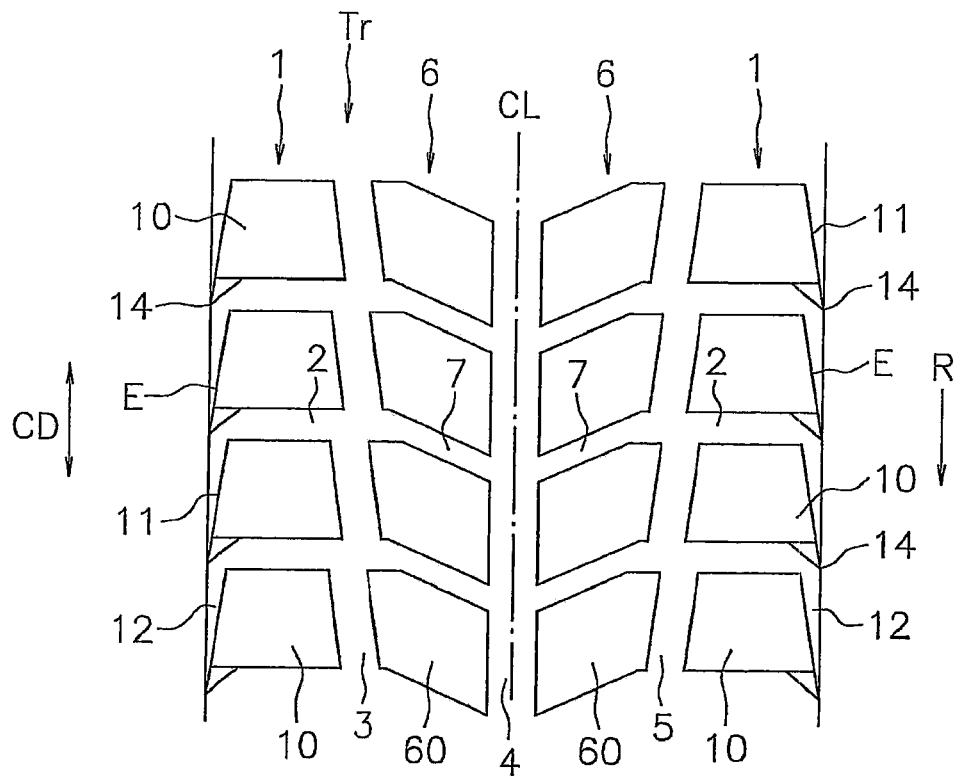
FIG. 5 is a plan view showing a tread surface in another embodiment of the present invention.

FIG. 5 is an example in which the present invention is applied to a tire of an installing direction designated type, and in the tire mentioned above, which one of the right and left sides of the tire faces the vehicle outer side is designated. In this case, since the respective pawl portions 14 extend in the rotating direction R in the shoulder land portions 1 on both sides, it is possible to effectively enhance the mud scooping action or the snow scooping action by the shoulder land portion 1.

In the tread surface Tr shown in FIGS. 1 and 5, since the shoulder land portion 1 is constituted by the blocks 10 which are segmented by the lateral grooves 2, it can contribute to an improvement of the off-road performance and the snow performance by the edge components of the lateral grooves 2. However, the present invention is not limited to this case, but the lateral groove 2 open to the outer wall 11 may be formed in a one-side closed shape which is not communicated with the circumferential groove.

Figure 6:
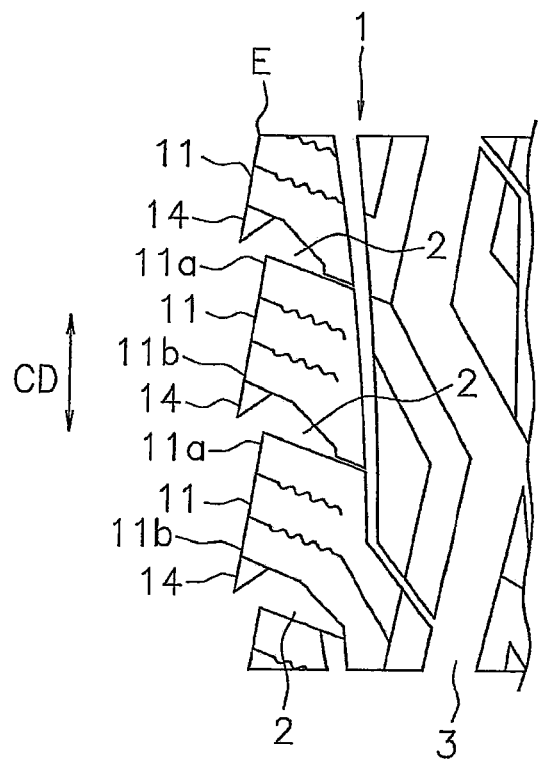
FIG. 6 is a plan view showing a shoulder land portion in another embodiment of the present invention.

In the pneumatic tire in accordance with the present invention, the tread pattern is not particularly limited as far as the shoulder land portion is formed as mentioned above. However, taking into consideration a drainage performance or the like, it is preferable that at least three circumferential grooves are formed in the tread surface. Further, the shape of the shoulder land portion can be appropriately modified, and a shape exemplified in FIG. 6 may be employed. In FIG. 6, the same symbols denote the portions same as the portions described in FIGS. 1 to 3.

The pneumatic tire in accordance with the present invention can be the same as the normal pneumatic tire except that the vacancy and the pawl portion as mentioned above are provided in the shoulder land portion 1, and the known material, shape, structure, manufacturing method and the like can be applied to the present invention.

Since the pneumatic tire in accordance with the present invention can improve the off-road performance and the snow performance as mentioned above, it is useful as a tire particularly installed to a light truck such as a pickup truck or a sport utility vehicle (SUV), or as a winter tire such as a studless tire.

Example

An example tire which concretely shows the structure and effect of the present invention will be explained. In each of the following performance evaluations, each test tire (tire size: LT265/70R17) was assembled to a rim of 17×7.5 JJ so as to be installed to a foreign-made utility truck, and a pneumatic pressure was set to 420 kPa in a front tire and 520 kPa in a rear tire. In each of the items, an evaluation is made by an index number while a result of a first comparative example being set to 100, the larger numerical value indicates the more excellent performance.

(1) Off-Road Performance

A start performance, a rectilinear propagation performance, a cornering performance and a braking performance on an unpaved test course were comprehensively evaluated through a subjective test by two drivers.

(2) Snow Performance

A start performance, a rectilinear propagation performance, a cornering performance and a braking performance on a pressed snow road test course were comprehensively evaluated through a subjective test by two drivers.

(3) Wandering Performance

A swinging degree of the vehicle at a time of traveling in a rut of a dry paved road test course at 80 km/h was evaluated through a subjective test by two drivers.

(4) On-Road Performance (Traveling Performance on on-Road)

A start performance, a rectilinear propagation performance, a cornering performance and a braking performance on a dry paved test course were comprehensively evaluated through a subjective test by two drivers.

(5) Noise Performance after Wear

A magnitude of a noise generated during a traveling on a paved road was evaluated through a subjective test by two drivers, by using tires which have traveled for 12000 km on an open road.

Figure 7:
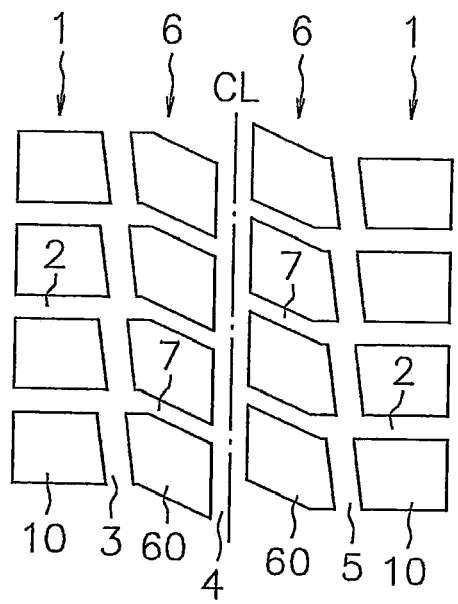
FIG. 7 is a plan view showing a tread surface in accordance with a first comparative example.
Figure 8:
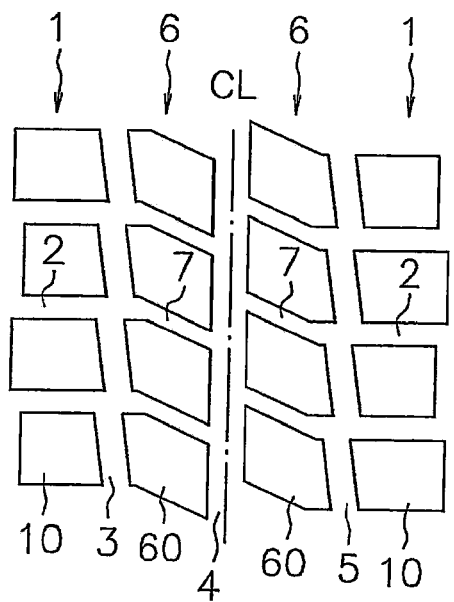
FIG. 8 is a plan view showing a tread surface in accordance with a second comparative example.

Tread patterns in a first comparative example, a second comparative example, a first example and a second example are respectively shown in FIG. 7, FIG. 8, FIGS. 1 to 3 and FIG. 5. In FIGS. 7 and 8, the same symbols denote the portions same as the portions described in the embodiment mentioned above. The first comparative example has the same structure as that of the first example except the fact that the vacancy and the pawl portion are not provided in the shoulder land portion. The second comparative example has the same structure as that of the first comparative example except the fact that the tread edges of the blocks constituting the shoulder land portion are shifted one by one in the tire width direction. Results of the evaluation are shown in Table 1.

TABLE 1

|  | Off-road performance | Snow performance | Wandering performance | On-road performance | Noise performance after wear |
|---|---|---|---|---|---|
| First Comparative Example | 100 | 100 | 100 | 100 | 100 |
| Second Comparative Example | 104 | 102 | 107 | 95 | 90 |
| First Example | 106 | 104 | 106 | 102 | 102 |
| Second Example | 108 | 106 | 106 | 104 | 102 |

As shown in Table 1, in the first and second examples, the off-road performance and the snow performance can be improved in comparison with the first and second comparative examples. Further, in the first and second examples, the wandering performance and the on-road performance are improved by forming the vacancy and the pawl portion in the shoulder land portion, and the noise performance after wear is also excellent in accordance with the suppression of the heel and toe wear.

What is claimed is:

1. A pneumatic tire comprising:

a shoulder land portion including a tread edge; and a plurality of lateral grooves which are open to an outer wall of the shoulder land portion and are arranged so as to be spaced from each other in a tire circumferential direction, the shoulder land portion and the lateral grooves being formed in a tread surface, wherein the tire is a square shape in which the tread edge is angulated as a shoulder shape, the tread edge is a linear ridge line between a top surface of the shoulder land portion and the outer wall, is located at an outermost position in a tire width direction of a tread grounding surface, and is inclined with respect to the tire circumferential direction, one end in the tire circumferential direction of the outer wall is positioned on an inner side in a tire width direction with respect to another end between the lateral grooves which are adjacent to each other in the tire circumferential direction, and a vacancy communicating with the lateral groove from the one end of the outer wall is formed so as to face the outer wall, and a pawl portion protruding in the tire circumferential direction is provided in a wall surface of the lateral groove which is close to the other end of the outer wall, the pawl portion being positioned in a tire width direction at the inside of the tread edge and having an outer surface in the tire width direction which extends in an extending direction of the tread edge, and a height of the pawl portion from a bottom of the lateral groove is gradually decreased toward a leading end.

2. The pneumatic tire according to claim 1, wherein the height in the leading end of the pawl portion is from 0 to 50% of the depth of the lateral groove.

3. The pneumatic tire according to claim 1, wherein the pawl portion is formed in a tapered shape in a plan view.

4. The pneumatic tire according to claim 1, wherein the outer wall is formed to be flat.

* * * * *